United States Patent [19]

Takahashi

[11] Patent Number: 4,770,143
[45] Date of Patent: Sep. 13, 1988

[54] SYSTEM AND METHOD FOR CONTROLLING IGNITION TIMING FOR AN INTERNAL COMBUSTION ENGINE

[75] Inventor: Nobutaka Takahashi, Yokosuka, Japan

[73] Assignee: Nissan Motor Company, Limited, Kanagawa, Japan

[21] Appl. No.: 15,308

[22] Filed: Feb. 17, 1987

[30] Foreign Application Priority Data

Feb. 14, 1986 [JP] Japan .................................. 61-31424

[51] Int. Cl.$^4$ .............................................. F02P 5/14
[52] U.S. Cl. .................................................... 123/425
[58] Field of Search .................... 123/425, 435; 73/35; 364/431.08

[56] References Cited

U.S. PATENT DOCUMENTS

| | | |
|---|---|---|
| 4,320,729 | 3/1982 | Sawada et al. ...................... 123/425 |
| 4,357,919 | 11/1982 | Hattori et al. ...................... 123/425 |
| 4,517,945 | 5/1985 | Ishigami et al. . |
| 4,517,952 | 5/1985 | Hosoya . |
| 4,582,032 | 4/1986 | Hara et al. . |
| 4,640,249 | 2/1987 | Kawamura et al. . |
| 4,658,789 | 4/1987 | Morita . |
| 4,660,535 | 4/1987 | Asano . |

FOREIGN PATENT DOCUMENTS

| | | | |
|---|---|---|---|
| 178875 | 10/1983 | Japan | .................................. 123/425 |
| 206877 | 12/1983 | Japan | .................................. 123/425 |
| 60-20584 | 5/1985 | Japan . | |

Primary Examiner—Tony M. Argenbright
Attorney, Agent, or Firm—Foley & Lardner, Schwartz, Jeffery, Schwaab, Mack, Blumenthal & Evans

[57] ABSTRACT

A system and method for controlling ignition timing for an internal combustion engine in which an engine operating range is divided into two ranges, i.e., a first range in which there is no possibility of an erroneous determination of malfunction in a knock detection system for detecting occurrence of engine knocking and a second range outside the first range. The determination of the malfunction in the first range has a higher priority than that in the second range. A fail safe function to cope with malfunctions in the knock detection system is performed over the whole engine operating range. Hence, an erroneous determination of malfunction in the knock detection system made in a low engine load and low engine speed range in which malfunction of the knock detection means is difficult to detect may be corrected or confirmed according to the result of a determination of a malfunction in the knock detection system in the first range. Consequently, the occurrence of engine knocking can properly be suppressed and reduction of engine output performance can be prevented through the whole engine operating range.

7 Claims, 2 Drawing Sheets

SYSTEM AND METHOD FOR CONTROLLING IGNITION TIMING FOR AN INTERNAL COMBUSTION ENGINE

BACKGROUND OF THE INVENTION

The present invention relates to a system and method for controlling ignition timing for an internal combustion engine especially but not exclusively installed in an automotive vehicle, in which a fail safe function is provided against malfunction of an engine knock detection circuitry in the ignition timing controlling system.

Ignition timing needs to be determined according to the operating state of internal combustion engines so that the engine may be operated at optimum efficiency.

Therefore, taking efficiency and fuel consumption of the engine into account, it is most preferable to ignite the fuel-air mixture supplied to each engine cylinder in the vicinity of a minimum advance angle when it will produce the maximum torque output, the so called MBT (Minimum advance for Best Torque). Therefore, the ignition timing controlling system functions to detect the operating condition of the engine and derive therefrom the optimum spark advance timing and to cause spark plugs within engine cylinders to be activated at the optimum timing.

However, under certain engine operating conditions, such as high engine speed or heavy engine load stable engine operation cannot be achieved due to the occurrence of engine knocking when the ignition timing is advanced to the MBT. In addition, such atmospheric conditions as temperature and humidity may affect the operating range in which knock may occur.

To cope with the problems described above, knock control systems have been developed in which the absence or presence of engine knock is detected and the ignition timing is controlled accordingly. There is, however, a problem in such knock control systems as described in that should the knock detection circuitry fail, to produce the knock detection information suitable for ignition timing control, i.e. retard of ignition timing advance angle cannot be carried out. Consequently, heavy vibration may occur in the engine due to the occurrence of knocking and in a worst case the engine may be destroyed.

To cope with the problem described above, it is desirable to adjust the ignition timing to an ignition timing angle at which engine knocking does not occur when the knock detection circuitry produces an alarm indicative of knocking.

A Japanese Patent Application First Publication (Tokkai) No. Sho 60-20584 published on May 22, 1985 exemplifies a conventional ignition timing controlling system for an internal combustion engine in which a fail safe function is provided against malfunction of the knock detection circuitry.

In the conventional ignition timing controlling system disclosed in the above-identified Japanese Patent document, the system is capable of detecting malfunction in the knock detection circuitry and provides a fail safe function by retarding the ignition timing angle when the malfunction in the knock detection circuitry is detected in order to avoid damage to the engine due to knocking. On the other hand, when load or engine speed is low and the likelihood of engine knocking is extremely low (hereinafter, this condition shall be referred to as a particular operating range), the above-described fail safe function is released (disabled) in the system disclosed in the above-identified Patent document to prevent the reduction of engine output performance accompanied with an inappropriate spark advance setting which may occur due to detection by the system of conditions that simulate, but are in actuality not, engine knock.

However, since the conventional ignition timing controlling system disclosed in the above-identified Patent document releases the fail safe function which would be performed in the particular operating range described above to avoid the reduction of engine performance that would accompany erroneous detection of knock. The fail safe function is not performed by the knock detection system if engine knocking occurs in the particular operating range. Although the occurrence of knocking in the particular range is quite infrequent it is still unacceptable in that it reduces engine performance and can cause damage or wear to the engine.

SUMMARY OF THE INVENTION

It is an object of the present invention to provide a system and method for controlling the ignition timing for the internal combustion engine which prevent the reduction of engine output performance.

It is another object of the present invention to provide the system and method for controlling the ignition timing for the internal combustion engine which provide the fail safe function over the whole engine operating range to suitably suppress the occurrence of engine knocking at the whole engine operating range.

It is yet another object of the present invention to provide the system and method for controlling the ignition timing for the internal combustion engine which prevent the erroneous determination of the malfunction in the knock detection system and in which a priority is provided for the determination of the malfunction in the knock detection system according to the engine operating range to ensure the determination of the malfunction in the knock detection system.

The above-described objects can be achieved by providing a system for controlling ignition timing for an internal combustion engine, comprising: (a) first means for detecting engine operating condition; (b) second means for detecting occurrence of engine knocking; (c) third means for determining whether the engine operating condition falls in a first range in which there is no possibility of erroneous determination of malfunction in second means or falls in a second range in which determination of malfunction is less reliable, when determining whether the second means is or operating normally on the basis of the conditions detected by the first means; (d) fourth means for calculating a knock correction amount by which the ignition timing for the engine is corrected so as to suppress the engine knocking to a predetermined level; (e) fifth means for determining whether there is malfunction in the second means on the basis of the determination result of an output level of the second means as compared with a predetermined output level and for giving a higher priority to the determination of malfunction in the second means when the engine operating condition falls in the first range than that when the engine operating condition falls in the second range; (f) sixth means for calculating a safety correction amount by which the ignition timing is retarded when the fifth means determines the malfunction in the second means; (g) seventh means for setting a basic ignition timing on the basis of the engine operating condition detected by the first means and correcting the basic ignition timing according to the calculated knock correction amount and safety correction amount; and (h) eighth means for igniting air-fuel mixture supplied to each engine cylinder on the basis of the ignition timing set and corrected by the seventh means.

The above-described objects can be achieved by providing a method for controlling an ignition timing for an internal combustion engine, comprising the steps of: (a) providing first means for detecting an occurrence of engine knock in the engine; (b) dividing an engine operating range into a first range in which there is no possibility of an erroneous determination whether the first means is operating normally or malfunctioning and a second range outside the first range; (c) determining whether the engine operates in the first range or second range; (d) determining wehther the first means is operating normally or malfunctioning when determining that the engine operates in the first range and in the second range; (e) providing a higher priority for the determination of malfunction in the first means made while the engine is operating in the first range that the determination of malfunction in the first means made while the engine operates in the second range; (f) calculating a safety ignition timing correction amount by which the ignition timing is changed toward a retardation angle side when malfunction of the first means is determined in the step (d); (g) calculating a knock supression ignition correction amount by which the ignition timing is changed toward the retardation angle side so as to suppress the engine knock to a predetermined level when the first means is determined to be operating normally and detects the occurrence of engine knock; (h) setting a basic ignition timing according to the engine operating condition and correcting the basic ignition timing according to the safety ignition correction amount and knock suppressing ignition timing correction amount in the steps (f) and (g); and (i) igniting air-fuel mixture supplied to the engine at a timing set and corrected in the step (h).

DETAILED DESCRIPTION OF THE PREFERRED EMBODIMENT

Reference will hereinafter be made to the drawings in order to facilitate understanding of the present invention.

Figure 1:
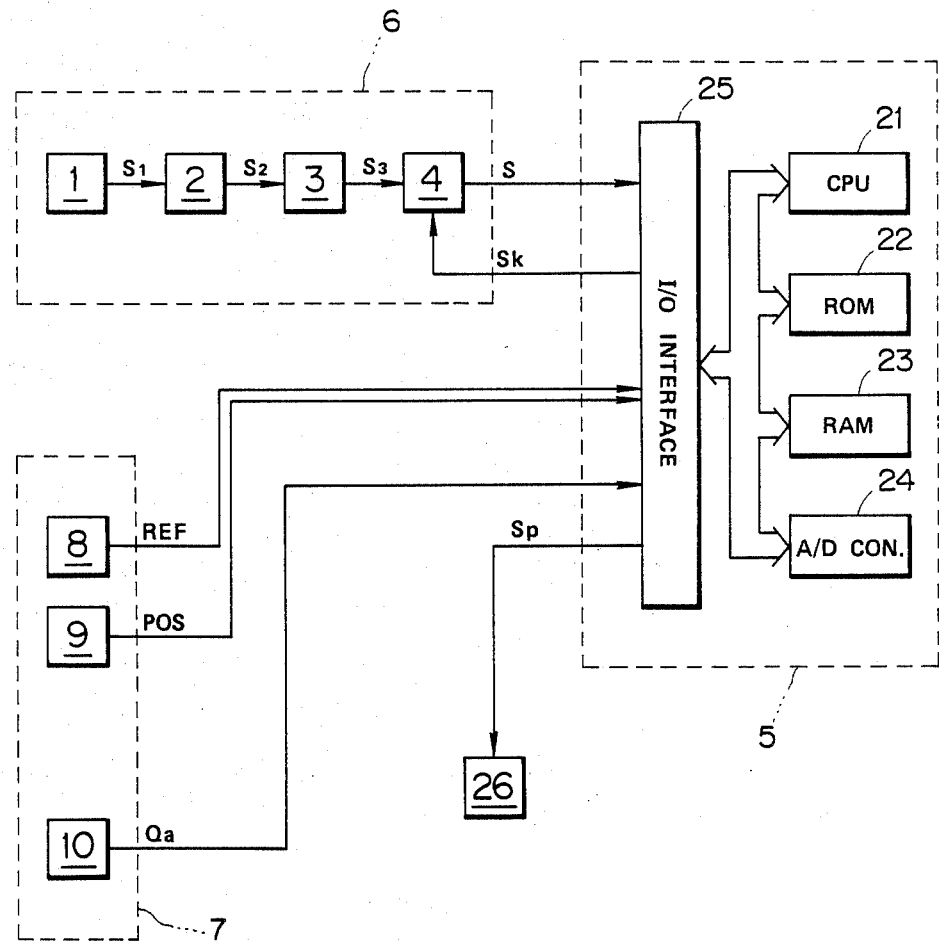
FIG. 1 is a simplified circuit block diagram of an ignition timing control system in a preferred embodiment according to the present invention.

FIG. 1 shows a preferred embodiment according to the present invention.

In FIG. 1, a knocking sensor 1 is installed within an engine body (not shown). The knocking sensor 1 detects a vibration generated on the engine body and outputs a signal $S_1$ indicative thereof. The output signal $S_1$ is sent to a band pass filter (BPF) 2. The band pass filter 2 enables only a signal component of the signal $S_2$ having a frequency band corresponding to the knocking vibration (for example, from 5 kHz to 20 kHz) to pass through a gate circuit 3. The gate circuit 3 interrupts signal components of ignition noises which disturb the detection of knocking from the signal $S_2$ derived from the band pass filter 2 and enables an effective signal component from which the ignition noise signal components are eliminated and outputs the effective signal component to an integrator 4.

The integrator 4 receives an integration interval signal $S_k$ from a microcomputer 5. The integrator 4 integrates the signal $S_3$ derived from the gate circuit 3 during an input interval of the integration interval signal $S_k$. Consequently, the integrator 4 outputs an integration value S which corresponds to a physical quantity associated with a vibration energy particular to the knocking. The integration interval signal $S_k$ is outputted, for example, in a range of 10° through 45° after a top dead center (TDC) in a compression stroke for each of engine cylinders. Hence, the integrator 4 starts integration of the signal $S_3$ when a piston of the corresponding engine cylinder reaches 10° ATDC (After Top Dead Center), and stops and resets the integration thereof when the same piston reaches 45° ATDC.

The integration processing interval of the signal $S_3$ is limited in the following reason.

That is to say, since in a case where the ignition noises or vibrations generated due to valves of other engine cylinders are approximate to the vibrations due to the knocking occurrence, such other background noises are erroneously determined to be the knocking vibration, the influence of such noises on the determination of knocking is eliminated with the integration processing interval limited only to an interval during which the normal engine knocking is expected to occur.

It is noted that the above described knocking sensor 1, band pass filter 2, gate circuit 3, and integrator 4 constitute knock detecting means 6.

The construction of the knock detecting means 6 is also exemplified by a U.S. patent application Ser. No. 749,497 filed on June 27, 1985 and assigned to the assignee of the present application. The disclosure of the above-identified U.S. Patent Application is hereby incorporated by reference.

The microcomputer 5 receives a signal derived from engine operating condition detecting means 7. The engine operating condition detecting means 7 is constituted by first, second crank angle sensors 8, 9 and air flow meter 10. The first crank angle sensor 8 produces a reference position signal REF which turns to a [H] level at a predetermined crank angular position, e.g., BTDC 70° before the top dead center (TDC) in the compression stroke of each engine cylinder for each explosion interval (120° of crank angular displacement in the case of six-cylinder engine, 180° of crank angular displacement in the case of four-cylinder engine). The second crank angular sensor 9 outputs a unit signal POS which turns to a high [H] level whenever the engine rotates through a unit angle (for example, 1°). It is noted that the reference signal REF derived from the first crank angle sensor 8 is counted to determine an engine revolution speed N. The airflow meter 10 detects an engine intake air quantity $O_a$.

The microcomputer 5 has functions of range determination, malfunction determination, fails safe, correction amount arithmetic operation, and ignition timing set (these functions are to be described later). The microcomputer 5 includes a CPU 21 (Central Processing Unit), ROM 22 (Read Only Memory), RAM 23 (Random Access Memory), A/D (Analog-to-Digital) converter 24, and I/O (Input/Output) interface 25. The CPU 21 retrieves external required data derived from the I/O interface 25 in accordance with a program written into the ROM 22 and carries out data transmission and reception to and from the RAM 23. The CPU 21 carries out the knock determination, the malfunction determination of the knock detection system, and the arithmetic operation processing of processed values required for the ignition timing control, and outputs processed data to the I/O interface 25 according to its necessity. The I/O interface 25 receives signals derived from the knock detection means 6 and engine operating condition detection means 7 and outputs the integration interval signal $S_k$ and an ignition signal $S_p$. The A/D converter 24 converts the external signal in analog form inputted to the I/O interface 25 into a corresponding digital signal. The ROM 22 stores an arithmetic operation program in the CPU 21 and the RAM 23 stores data used in the arithmetic operation in the form of a map. The ignition signal $S_p$ is sent to the ignition means 26. The ignition means 26, e.g, includes an ignition coil, distributor, and ignition plugs installed in each engine cylinder. The ignition coil produces a high surge voltage on the basis of the ignition signal and the high surge voltage is sent to one of the ignition plugs via the distributor according to an ignition order so that air-fuel mixture supplied to the corresponding engine cylinder is ignited and burnt.

An action of the ignition timing control system will be described below.

Figure 2:
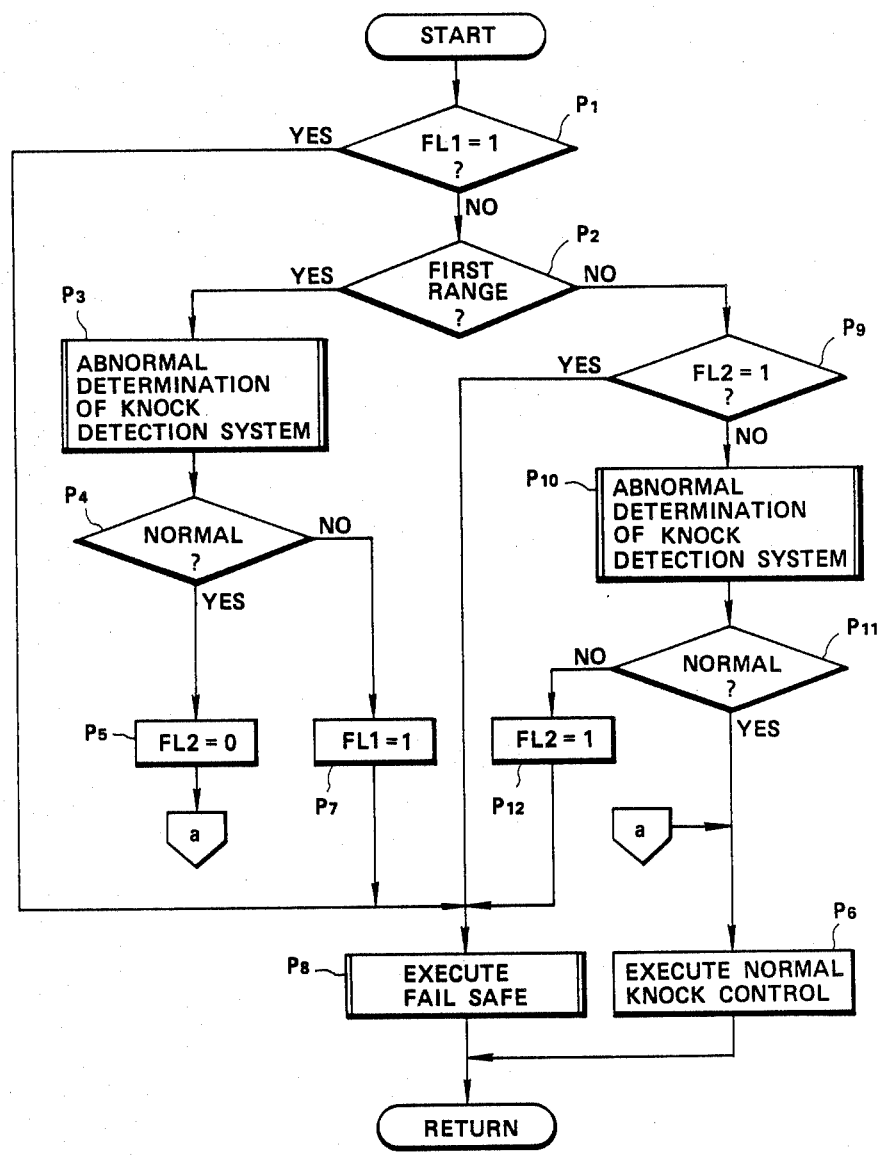
FIG. 2 is a flowchart indicating a knocking control procedure executed in the ignition timing control system shown in FIG. 1.

FIG. 2 is a flowchart representing a program to be executed by means of the microcomputer 5.

This program is executed once for each predetermined period of time as a part of the knocking control programs.

In FIG. 2, the CPU 21 determines whether a first flag FL1 is turned to a "1" in a first step $P_1$. It is noted that the first flag FL1 is set (FL1=1) when the knock detection system (it refers to the circuitry of the knock detection means 6) is determined to be abnormal. The first flag FL1 is reset (FL1=0) when not. If FL1=0, the routine goes to a step $P_2$ and the CPU 21 determines whether the engine operating range falls within a first range. This determination is carried out with the intake air quantity $Q_a$ and engine revolution speed N, e.g., representing the engine operating condition being set to parameters. The above-described first range refers to an area in which the processing of determination on the malfunction of the knock detection system can be assured and is accurately predefined through experiments from a cause-to-effect relationship to the frequency of knocking. On the other hand, an area of engine operating range except the first range is classified as a second range. Then, these areas are previously prepared as a table map and a range which corresponds to the above-described parameters $Q_a$ and N is determined in a table look up technique.

The routine shown in FIG. 2 is branched according to the result of determination in the step $P_2$.

[I] The case where the CPU 21 determines that the engine operating range falls within the first range in the step $P_2$.

In the first range (Yes in the step $P_2$), the CPU 21 carries out the malfunction determination processing in the knock detection system in a step $P_3$. The malfunction determination processing is carried out in such a way that the integration value S outputted, e.g., from the knock detection system is compared with a permissible limit value large enough to be determined to be normal in the engine operating range from the engine revolution speed N and intake air quantity $Q_a$ and which is looked up from the table. In such a determination processing, respective permissible limit values of the integration value S are previously prepared over a wide engine operating range in the data table format. The determination processing can accurately be carried out at a low cost in accordance with the software program.

Upon the completion of the above-described malfunction determination processing, the routine goes to a step $P_4$ in which the CPU 21 determines whether the knock detection system is normal. If it is normal in the step $P_4$, the routine goes to a step $P_5$ in which a second flag 2 is reset. Thereafter, the routine goes to a step $P_6$ in which a normal knocking control (knock control in FIG. 2) to suppress the occurrence of engine knocking is executed on the basis of another program. It is noted that the second flag FL2 is set when the CPU 21 determines that the knock detection system is abnormal in the second range and is reset in the other cases. In addition, in this case the determination of malfunction in the knock detection system when the engine is operated in each of the first and second ranges is processed with a higher priority taken to the first range than the second range. This is because the first range is limited to a range in which the above-described malfunction determination can securely be carried out. Hence, if the determination result is normal in the first range, the processing of the program shown in Fig. 2 is executed in accordance with the result that the knock detection system is normal in the first range with the result that the knock detection system is abnormal in the second range canceled even if the determination that the knock detection system is abnormal has resulted in the second range.

Therefore, when the determination result that the knock detection system is normal in the first range, the second flag FL2 is reset in the step $P_4$ so that the accurate determination of malfunction in the knock detection system can be assured over the whole engine operating range.

An example of the above-mentioned knock control will be described below.

When the occurrence of engine knocking is detected, a modification amount m of ignition timing is calculated according to a level of engine knocking. Thereafter, a sum of a previous ignition timing correction amount M' and present ignition timing modification amount m (M'+m) is defined as a present ignition timing correction amount M (which corresponds to a knock correction amount). That is to say, M=M'+m.

In addition, a basic ignition timing value (which corresponds to, so called, an advance angle value) N is derived, e.g., from a predetermined data table on the basis of the engine operating parameters including the engine revolution speed N and intake air quantity $Q_a$. Then a final ignition timing (N+M) is determined from the basic ignition timing value N and the above-described present correction amount M. When the time reaches the final ignition timing value, the ignition signal $S_p$ is outputted from the microcomputer shown in FIG. 1 to the ignition means 26 so that the ignition means 26 carried out the ignition operation for the corresponding engine cylinder as described above. In this way, the ignition timing is retarded so as to suppress the engine knocking according to the level of engine knocking. At this time, since the determination on the malfunction in the knock detection system is carried out in the first range, the accuracy of the malfunction determination is so high that no erroneous determination of malfunction has resulted. Hence, the ignition timing control corresponds to the present engine operating condition and no reduction of engine output performance can be achieved.

On the other hand, when the CPU 21 determines that the knock detection system malfunctions in the step $P_4$ the routine goes to a step $P_7$ in which the first flag FL1 is set. Thereafter, the CPU 21 executes the fail safe operation. In details, the ignition timing is retarded by a predetermined amount on the basis of the accurate determination that the knock detection system malfunctions in order to suppress the occurrence of engine knocking and to avoid the reduction of engine output performance.

An example of the fail safe control will be described in details below.

When the CPU 21 determines that the knock detection system malfunctions, a correction amount of the ignition timing toward the retardation angle side is calculated as a safety correction amount G. Then, the final ignition timing (N+G) is calculated from the safety correction amount G and the above-described basic ignition timing value N. The microcomputer 5 then outputs the ignition signal $S_p$ at the final ignition timing thus calculated to the ignition means 26. The ignition means 26 then carries out the ignition operation in response to the ignition signal $S_p$ in the way described above. Therefore, the occurrence of engine knocking can properly be suppressed in spite of the malfunction in the knock detection system. [II] The case where the engine operating range falls within the second range in the step $P_2$.

In this case, the routine goes to a step $P_9$ in which the CPU 21 determines whether the second flag FL2 is set. If FL2=0, the routine goes to a step $P_{10}$ in which the processing of determination on the malfunction in the knock detection system is carried out in the same way as in the step $P_3$. Then, in a step $P_{11}$, the CPU 21 determines the result of the malfunction determination.

If the CPU 21 determines that the knock detection system is normal in the step $P_{11}$, the routine goes to the step $P_6$ in which the normal knock control is executed in the way described above. On the other hand, if the CPU 21 determines that the knock detection is abnormal in the step $P_{11}$, the routine goes to a step $P_{12}$ in which the second flag FL2 is set (FL2=1). Thereafter, the routine goes to the step $P_8$ in which the fail safe control is executed in the way described above.

In addition, if the second flag FL2 is set (FL2=1) in the step $P_9$, the routine goes to the step $P_8$ since the knock detection system is abnormal.

In this way, the determination on the malfunction in the knock detection system is carried out in the second range in the same way as in the first range. During the occurrence of malfunction in the knock detection system, the fail safe control is executed. Hence, the reduction of the engine output performance can be prevented with the occurrence of engine knocking suppressed in the particular range as different from the conventional ignition timing control system. Consequently, the ignition timing control system according to the present invention can meet the recent demand that the high-level engine operability be secured.

On the other hand, if the first flag FL1 is set (FL1=1) in the step $P_1$, the routine goes directly to the step $P_8$ in which the fail safe control described above is executed and then returns to this routine.

Table 1 shows a decision table and states of the two flags FL1 and FL2 for facilitating understanding of the above-described series of processings.

TABLE 1

| Status of flags at the time of START of program | | 1 | 0 | 0 | 0 | 0 | 0 | 0 | 0 |
|---|---|---|---|---|---|---|---|---|---|
| | FL1 | 1 | 0 | 0 | 0 | 0 | 0 | 0 | 0 |
| | FL2 | — | 0 | 0 | 0 | 0 | 1 | 1 | 1 |
| range | First (1) | — | X | X | | | X | X | |
| | Second (2) | — | | | X | X | | | X |
| malfunction determination | Normal | — | X | | X | | X | | — |
| | Abnormal | — | | X | | X | | X | — |
| Control | Normal Control | | X | | X | | X | | |
| | Fail Safe | X | | X | | X | | X | X |
| Status of flags at the time of RETURN of program | FL1 | 1 | 0 | 1 | 0 | 0 | 0 | 1 | 0 |
| | FL2 | — | 0 | — | 0 | 1 | 0 | 1 | 1 |

In this table, symbol—denotes an arbitrary symbol X denotes a symbol indicating that the present state corresponds to the state shown left, numeral 1 denotes the set state of the corresponding flag and numeral 0 denotes the reset state of the corresponding flag.

In the preferred embodiment described above, the erroneous determination on the malfunction in the knock detection system is avoided by providing a higher priority for the malfunction determination in the first range than that in the second range (That is to say, a check function provided in the ignition timing control system ensures the accurate determination on the malfunction in the knock detection system in the second range as well as the first range). In addition, since in the preferred embodiment the fail safe function is performed over the whole engine operating range, the occurrence of engine knocking can properly be suppressed in the whole engine operating range, especially in the particular range of the low engine load area and/or low engine revolution speed area. At the same time, the reduction of engine output performance can be prevented.

In the way described above, since in the ignition timing control system and method according to the present invention the engine operating range is divided, the priority is provided for the determination on the malfunction in the knock detection system according to the divided engine operating range in order to prevent the erroneous determination on the malfunction, and the fail function is provided over the whole engine operating range, the occurrence of engine knocking can properly be suppressed and the reduction of engine output performance can be prevented in the whole engine operating range.

It will fully be understood by those skilled in the art that the foregoing description is made in terms of the preferred embodiment and various changes and modifications may be made without departing from the scope of the present invention which is to be defined by the appended claims.

What is claimed is:

1. A system for controlling ignition timing for an internal combustion engine, comprising:
   (a) first means for detecting an engine operating condition;
   (b) second means for detecting occurrence of engine knocking;
   (c) third means for determining whether the engine operating condition falls in a first range in which there is no possibility of an erroneous determination of malfunction in said second means or falls in a second range in which a determination of malfunction is less reliable, when determining whether the second means is operating normally on the basis of the condition detected by the first means;

(d) fourth means for calculating a knock correction amount by which the ignition timing for the engine is corrected so as to suppress the engine knocking to a predetermined level;

(e) fifth means for determining whether there is a malfunction in the second means on the basis of a result of a comparison between an output of the second means and a predetermined output level, and for giving a higher priority to the determination of malfunction in the second means when the engine operating condition falls in the first range than when the engine operating condition falls in the second range;

(f) sixth means for calculating a safety correction amount by which the ignition timing is retarded when the fifth means determines the malfunction in the second means;

(g) seventh means for setting a basic ignition timing on the basis of the engine operating condition detected by the first means and correcting the basic ignition timing according to the calculated knock correction amount and safety correction amount; and (h) eighth means for igniting air-fuel mixture supplied to each engine cylinder on the basis of the ignition timing set and corrected by the seventh means.

2. The system according to claim 1, wherein the fifth means compares the output of the second means with a predetermined permissible value which indicates that the second means is operating normally and which is determined according to the engine operating condition detected by the first means.

3. A method for controlling an ignition timing for an internal combustion engine. comprising the steps of:

(a) providing first means for detecting an occurrence of engine knock in the engine;

(b) dividing an engine operating range into a first range in which there is no possibility of an erroneous determination whether the first means is operating normally or malfunctioning and a second range outside the first range;

(c) determining whether the engine operates in the first range or second range;

(d) determining whether the first means is operating normally or malfunctioning when determining that the engine operates in the first range and in the second range;

(e) providing a higher priority for the determination of malfunction in the first means made while the engine is operating in the first range than the determination of malfunction in the first means made while the engine operates in the second range;

(f) calculating a safety ignition timing correction amount by which the ignition timing is changed toward a retardation angle side when malfunction of the first means is determined in the step (d);

(g) calculating a knock suppression ignition correction amount by which the ignition timing is changed toward the retardation angle side so as to suppress the engine knock to a predetermined level when the first means is determined to be operating normally and detects the occurrence of engine knock;

(h) setting a basic ignition timing according to the engine operating condition and correcting the basic ignition timing according to the safety ignition correction amount and knock suppressing ignition timing correction amount in the steps (f) and (g); and (i) igniting air-fuel mixture supplied to the engine at a timing set and corrected in the step (h).

4. The method according to claim 3, wherein in the step (d), the determination whether the first means operates normally or malfunctions when the engine operates in the first range and in the second range is based on whether a detection signal outputted from the first means is compared with a predetermined permissable value which would indicate that the first means operates normally.

5. The method according to claim 4, wherein the predetermined permissible value is predetermined according to the engine operating condition.

6. The method according to claim 5, wherein the predetermined permissible value is predetermined according to an engine intake air quantity and engine revolution speed.

7. The method according to claim 3, wherein the knock suppressing ignition timing correction amount is calculated in such a way that a modification amount for the ignition timing is calculated according to a level of engine knocking and the present knock suppression ignition timing correction amount is calculated by summing the presently calculated modification amount to a previously calculated knock suppression ignition timing correction amount.

* * * * *